(12) United States Patent
Finkel

(10) Patent No.: US 12,212,831 B2
(45) Date of Patent: Jan. 28, 2025

(54) ELECTRICAL CONNECTIVITY BETWEEN DETACHABLE COMPONENTS

(71) Applicant: GoPro, Inc., San Mateo, CA (US)

(72) Inventor: Paul Finkel, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/162,925

(22) Filed: Feb. 1, 2023

(65) Prior Publication Data

US 2023/0179850 A1  Jun. 8, 2023

Related U.S. Application Data

(63) Continuation of application No. 17/275,971, filed as application No. PCT/US2019/043406 on Jul. 25, 2019, now Pat. No. 11,601,575.
(Continued)

(51) Int. Cl.
| | |
|---|---|
| *H04N 23/54* | (2023.01) |
| *G03B 17/14* | (2021.01) |
| *H01R 12/71* | (2011.01) |
| *H04N 23/55* | (2023.01) |
| *H04N 23/57* | (2023.01) |
| *H04N 23/65* | (2023.01) |

(52) U.S. Cl.
CPC ............ *H04N 23/54* (2023.01); *G03B 17/14* (2013.01); *H01R 12/714* (2013.01); *H01R 12/718* (2013.01); *H04N 23/55* (2023.01); *H04N 23/57* (2023.01); *H04N 23/65* (2023.01); *G03B 2206/00* (2013.01)

(58) Field of Classification Search
None
See application file for complete search history.

(56) References Cited

U.S. PATENT DOCUMENTS

| | | | |
|---|---|---|---|
| 3,324,445 A | * | 6/1967 | Miller .................... H01R 13/22 |
| | | | 439/367 |
| 4,647,171 A | | 3/1987 | Yamaki |
| | | (Continued) | |

FOREIGN PATENT DOCUMENTS

| | | |
|---|---|---|
| CN | 1498061 A | 5/2004 |
| CN | 2681381 Y | 2/2005 |
| | (Continued) | |

OTHER PUBLICATIONS

English translation of JP-2011239301-A, Oka, Nov. 24, 2011 (Year: 2011).*
(Continued)

*Primary Examiner* — James M Hannett
(74) *Attorney, Agent, or Firm* — Young Basile Hanlon & MacFarlane, P.C.

(57) ABSTRACT

In one aspect of the present disclosure, a digital image capturing device (DICD) is disclosed that includes a device body with a printed circuit board (PCB), and an integrated sensor-lens assembly (ISLA) that is configured for releasable connection to the device body. The PCB defines a plurality of openings that extend therethrough and includes a plurality of connector pins that are fixedly positioned within the openings. The ISLA includes at least one connective surface that is configured for contact with the connector pins to establish electrical communication between the device body and the ISLA.

20 Claims, 15 Drawing Sheets

Related U.S. Application Data

(60) Provisional application No. 62/731,239, filed on Sep. 14, 2018.

(56) References Cited

U.S. PATENT DOCUMENTS

| | | | |
|---|---|---|---|
| 6,020,699 | A | 2/2000 | Maggio |
| 6,249,653 | B1 | 6/2001 | Itoh |
| 6,360,431 | B1 | 3/2002 | Harrison |
| 6,683,298 | B1 | 1/2004 | Hunter |
| 6,717,618 | B1 | 4/2004 | Yoshikawa |
| 6,822,684 | B1 | 11/2004 | Suzuki |
| 10,966,306 | B1 | 3/2021 | Recker |
| 2005/0279916 | A1 | 12/2005 | Kang |
| 2009/0186500 | A1 | 7/2009 | Benoit |
| 2009/0297136 | A1 | 12/2009 | Lin |
| 2010/0011151 | A1 | 1/2010 | Chu |
| 2010/0053391 | A1 | 3/2010 | Huang |
| 2010/0111517 | A1 * | 5/2010 | Yasuda ................ G03B 17/00 396/532 |
| 2010/0296319 | A1 | 11/2010 | Liu |
| 2012/0276951 | A1 | 11/2012 | Webster |
| 2013/0088687 | A1 | 4/2013 | Terashima |
| 2015/0009460 | A1 | 1/2015 | Jang |
| 2015/0094603 | A1 | 4/2015 | Eilebrecht |
| 2016/0104979 | A1 | 4/2016 | Korn |
| 2017/0004843 | A1 | 1/2017 | Lamy |
| 2017/0048432 | A1 | 2/2017 | Campbell |
| 2021/0053407 | A1 * | 2/2021 | Smith ................ B60D 1/64 |
| 2022/0038608 | A1 | 2/2022 | Finkel |

FOREIGN PATENT DOCUMENTS

| | | | |
|---|---|---|---|
| CN | 1601909 | A | 3/2005 |
| CN | 101043042 | A | 9/2007 |
| CN | 101056046 | A | 10/2007 |
| CN | 201038364 | Y | 3/2008 |
| CN | 101216588 | A | 7/2008 |
| CN | 101726965 | A | 6/2010 |
| CN | 101825962 | A | 9/2010 |
| CN | 102124625 | A | 7/2011 |
| CN | 102957854 | A | 3/2013 |
| CN | 103856064 | A | 6/2014 |
| CN | 104469106 | A | 3/2015 |
| CN | 104510465 | A | 4/2015 |
| CN | 105099136 | A | 11/2015 |
| CN | 105302240 | A | 2/2016 |
| CN | 105544618 | A | 5/2016 |
| CN | 105633107 | A | 6/2016 |
| CN | 105814788 | A | 7/2016 |
| CN | 105939128 | A | 9/2016 |
| CN | 106233722 | A | 12/2016 |
| CN | 106549569 | A | 3/2017 |
| CN | 206498237 | U | 9/2017 |
| CN | 107534774 | A | 1/2018 |
| CN | 107688268 | A | 2/2018 |
| DE | 10323482 | A1 | 12/2004 |
| DE | 202006006022 | U1 | 8/2006 |
| DE | 102009044809 | A1 | 6/2011 |
| EP | 2624422 | A2 | 8/2013 |
| JP | 2011239301 | A * | 11/2011 |
| JP | 2018033070 | A | 3/2018 |
| KR | 20080053811 | A | 6/2008 |
| WO | 2005034297 | | 4/2005 |

OTHER PUBLICATIONS

International Preliminary Report on Patentability for App. No. PCT/US2019/043406, dated Mar. 25, 2021, 8 pages.

PCT International Search Report and Written Opinion for PCT/US 2019/043406 dated Oct. 17, 2019, 10 pages.

* cited by examiner

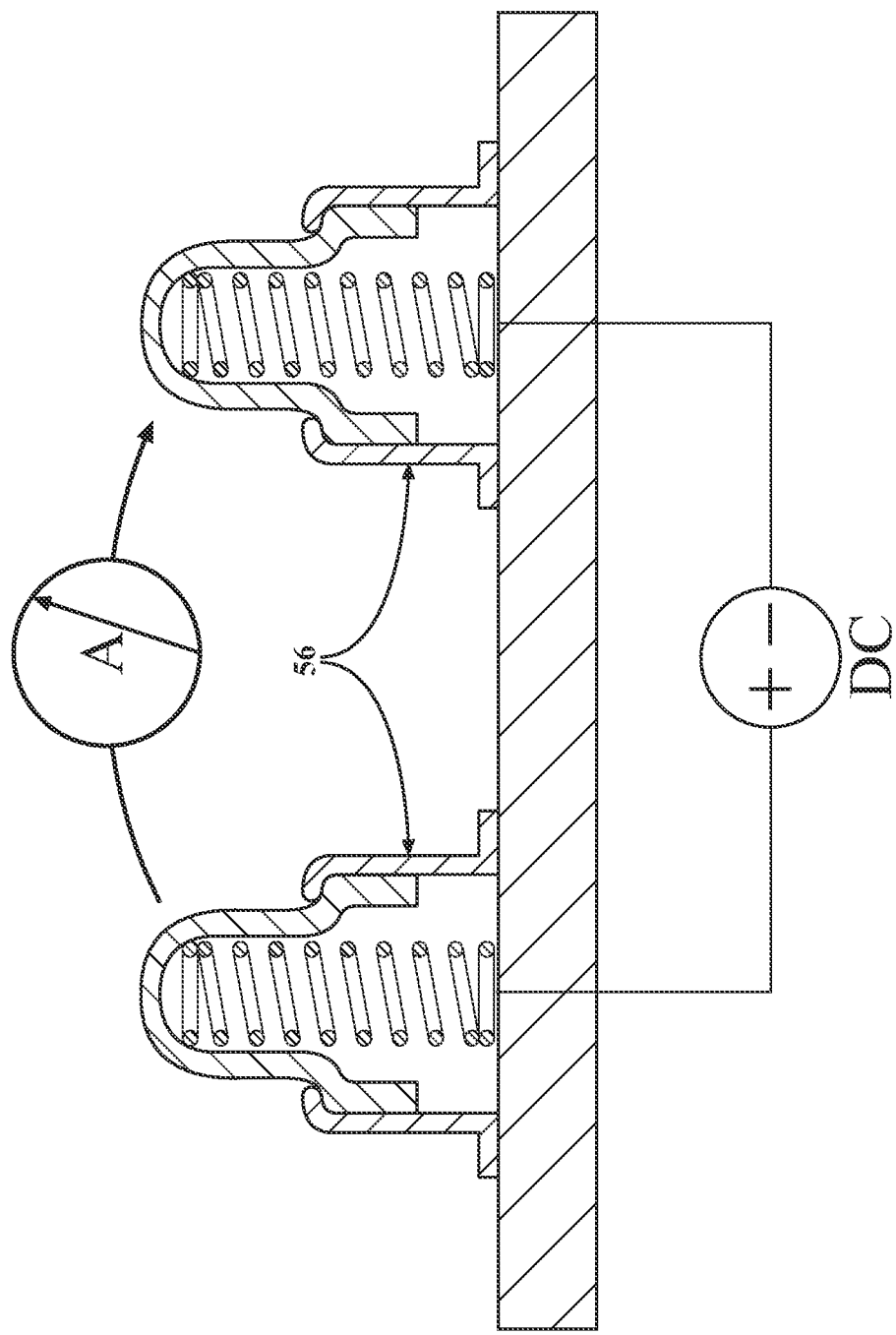

ELECTRICAL CONNECTIVITY BETWEEN DETACHABLE COMPONENTS

CROSS REFERENCE TO RELATED APPLICATION(S)

This application is a continuation of U.S. patent application Ser. No. 17/275,971, filed Mar. 12, 2021, which is a U.S. National Stage of International Application No. PCT/US2019/043406, filed on Jul. 25, 2019, which claims the benefit of U.S. Provisional Patent Application No. 62/731,239 filed on Sep. 14, 2018, the entire contents of which are incorporated by reference herein.

TECHNICAL FIELD

The present disclosure relates generally to establishing electrical connections between detachable components. For example, in one implementation, the present disclosure relates to establishing an electrical connection between a digital image capturing device (DICD) and one or more detachable integrated sensor-lens assemblies (ISLAs).

BACKGROUND

DICDs are used in various applications, including, for example, handheld cameras and video recorders, drones, and vehicles. DICDs typically include one or more optical elements (e.g., lenses) as well as one or more image sensors. The optical element(s) capture content by receiving and focusing light, and the captured content is converted to an electronic signal by the image sensor. The signal generated by the image sensor is then processed by an image signal processor to form an image. In some DICDs, optical element(s) and image sensor(s) are assimilated into a single unit known as an integrated sensor-lens assembly (ISLA).

A prerequisite to the detachability of an ISLA, and interchangeability between different ISLAs, is the establishment of an easy, reliable electrical connection with the DICD. The repeated connection and disconnection of an ISLA, however, can result in damage to the electrical connectors, which are typically surface-mounted to a supportive substrate, such as a printed circuit board (PCB). Such damage can occur, for example, due to the shearing (lateral) forces experienced during repeated connection and disconnection of an ISLA, which can eventually degrade the connection between the connector pins and the substrate over time and result in compromised or lost connectivity.

Additionally, over time, the DICD and/or the ISLA(s) may be exposed to environmental or incidental moisture, dirt, debris, and the like, including, for example, rain, salt water, sweat, sand, and dust, which may result in corrosion of the electrical contacts, thereby frustrating (or entirely preventing) connectivity between the DICD and the ISLA(s).

To address these concerns, the present disclosure describes various structures and methods for protecting and maintaining electrical connectivity between a DICD and one or more ISLAs and for reducing (or preventing) the corrosion of electrical contacts.

SUMMARY

In one aspect of the present disclosure, a digital image capturing device (DICD) is disclosed that includes a device body and an integrated sensor-lens assembly (ISLA) that is configured for releasable connection to the device body. The device body includes a printed circuit board (PCB) defining a plurality of apertures extending therethrough, and a plurality of connector pins that are fixedly positioned within the apertures. The ISLA includes at least one connective surface that is configured for contact with the connector pins to establish electrical communication between the device body and the ISLA.

In certain embodiments, the connector pins may each include a first end defining a connective surface and an opposing second end, and the PCB may include a first side facing outwardly away from the DICD and an opposing second side facing inwardly towards the DICD. In such embodiments, the second ends of the connector pins may be flush mounted with respect to the first side of the PCB. Alternatively, the connector pins may each include a flange that is configured for contact with the second side of the PCB, wherein the flanges define transverse cross-sectional dimensions that are larger than those defined by the apertures. In certain embodiments, the DICE may further include a sealing member that is positioned about the connector pins. In certain embodiments, the sealing member may include a hydrophobic material. In certain embodiments, the sealing member may include a compressible material. In certain embodiments, the sealing member may be resiliently reconfigurable between a first configuration, in which the connector pins are concealed by the sealing member, and a second configuration, in which the connector pins are at least partially exposed from the sealing member. In certain embodiments, the sealing member may be configured for compression during movement from the first configuration to the second configuration to at least partially expose the connector pins, and for expansion during movement from the second configuration to the first configuration to conceal the connector pins. In certain embodiments, the sealing member may include a plurality of openings that are positioned in general alignment with the connector pins such that the connector pins are extendable through the sealing member during connection of the ISLA and the device body to facilitate electrical communication between the device body and the ISLA. In certain embodiments, the openings in the sealing member may be configured as slits, which may be biased closed. In certain embodiments, the DICD may further include: a power source supplying power to the device body; a first converter supported by the device body that is in electrical communication with the power source; a second converter supported by the ISLA; and a controller in communication with the first and second converters. The first converter is adapted such that power from the power source is input to the first converter at a first level and output from the first converter to the connector pins at a second level less than the first level, and the second converter is adapted such that power from the connector pins is input to the second converter at the second level and output from the second converter at a third level greater than the second level. The controller selectively activates the first and second converters such that the DICD is operable in a first mode, in which the first and second converters are inactive, and a second mode, in which the first and second converters are active to vary power flowing from the power source to the ISLA through the connector pins. In certain embodiments, the second converter may be adapted such that the third level is greater than (or equal to) the second level. In certain embodiments, the DICD may further include a sensor that is adapted to detect moisture proximate (e.g., adjacent to, near, or in contact with) the connector pins and/or a flow of current between the connector pins. In certain embodiments, the sensor may be in communication with the controller to alternate operation of the DICD between the first and second modes. It is envisioned that the DICD described above may include any combination of the features and the elements described in this paragraph.

In another aspect of the present disclosure, a DICD is disclosed that includes a device body; an ISLA that is configured for releasable connection to the device body; and a sealing member. The device body includes a first electrical contact in communication with a power source supported by the device body, and the ISLA includes a second electrical contact that is configured and positioned in general alignment with the first electrical contact to establish electrical communication between the device body and the ISLA. In certain embodiments, one of the first and second electrical contacts may include a plurality of connector pins and the other of the first and second electrical contacts may include a connective surface. The sealing member is positioned about the connector pins and includes a resiliently compressible material such that the sealing member is reconfigurable between first and second configurations upon connection and disconnection of the ISLA and the device body. In the first configuration, the connector pins are concealed by the sealing member, and in the second configuration, the connector pins are at least partially exposed from the sealing member.

In certain embodiments, the sealing member may be configured for compression during movement from the first configuration to the second configuration to at least partially expose the connector pins, and for expansion during movement from the second configuration to the first configuration to conceal the connector pins. In certain embodiments, the sealing member may include a plurality of openings in general alignment with the connector pins such that the connector pins are extendable through the openings during connection of the ISLA and the device body to facilitate electrical communication between the first and second electrical contacts. In certain embodiments, the openings in the sealing member are biased closed by the resiliently compressible material such that water and/or debris are expelled during expansion of the sealing member from the second configuration to the first configuration. In certain embodiments, the DICD may further include: a first converter in communication with the power source that is supported by the device body; a second converter that is supported by the ISLA; and a controller that is in communication with the first and second converters. The first converter is adapted such that power from the power source is input to the first converter at a first level and output from the first converter at a second level less than the first level, and the second converter is adapted to receive power at the second level and output power at a third level greater than the second level. The controller is adapted to selectively activate the first and second converters such that the DICD is operable in a first mode, in which the first and second converters are inactive, and a second mode, in which the first and second converters are active to vary power flowing from the power source to the ISLA through the first and second electrical contacts. In certain embodiments, the DICD may further include a sensor that is adapted to detect moisture proximate the connector pins and/or a flow of current between the connector pins. The sensor may also be in communication with the controller to alternate operation of the DICD between the first and second modes. It is envisioned that the DICD described above may include any combination of the features and the elements described in this paragraph.

In another aspect of the present disclosure, a DICD is disclosed that includes a device body; a direct current (DC) power source that is supported by the device body; a commutation circuit in communication with the power source to commutate direct current from the power source to alternating current (AC); an ISLA that is configured for releasable connection to the device body; and a decommutation circuit in electrical communication with the second electrical contact on the ISLA to return the alternating current to direct current. The device body includes a first electrical contact having a plurality of connector pins, and the power source is in electrical communication with the connector pins. The ISLA includes a second electrical contact that is configured for contact with the connector pins such that the alternating current is communicated from the device body to the ISLA following commutation. It is envisioned that the DICD described above may include any combination of the features and the elements described in this paragraph.

BRIEF DESCRIPTION OF THE DRAWINGS

FIG. 15 is a partial, cross-sectional view of the DICD seen in FIG. 14 showing the flow of current between electrical contacts.

DETAILED DESCRIPTION

The present disclosure describes structures and methods for protecting and maintaining electrical connectivity between detachable components and reducing (or preventing) the corrosion of electrical contacts (e.g., connector pins) in the presence of water, moisture, and/or debris. Throughout the present disclosure, use of the terms "water" and "moisture" should be understood to include any and all environmental and/or incidental dampness (e.g., rain, salt water, sweat, and/or humidity) which may cause corrosion of the electrical contacts.

Illustratively, the structures and methods described herein are discussed in the context of digital image capturing devices (DICDs) and interchangeable integrated sensor-lens assemblies (ISLAs). It should be appreciated, however, that the principles of the present disclosure may be applied to any system or platform including electrical connections and/or disconnectable power sources, such as, for example, batteries and battery extenders.

In one aspect, the present disclosure describes the embedding of connector pins into a supportive substrate (e.g., a PCB) such that any applied forces (e.g., shearing or lateral) are absorbed and resisted by the substrate itself, rather than by the connection between the connector pins and the substrate, thus extending the life of the connector pins and preserving electrical connectivity. To further preserve electrical connectivity, the present disclosure also describes various structures and methods useful in the reduction (or elimination) of energy flow between adjacent electrical contacts, including, for example, the incorporation of a resilient, compressible seal and/or hydrophobic materials that mitigate the intrusion of water/moisture (and/or debris) and inhibit (or entirely prevent) the formation of a conductive path that may otherwise cause corrosion and compromise (frustrate) electrical connectivity between components. To further mitigate (or prevent) corrosion, the present disclosure also describes the incorporation of a buck-to-boost converter system, which reduces power communicated between electrical contacts, as well as commutation and decommutation circuitry that varies power between direct and alternating current to reduce the effective voltage across the electrical contacts.

Figure 1:
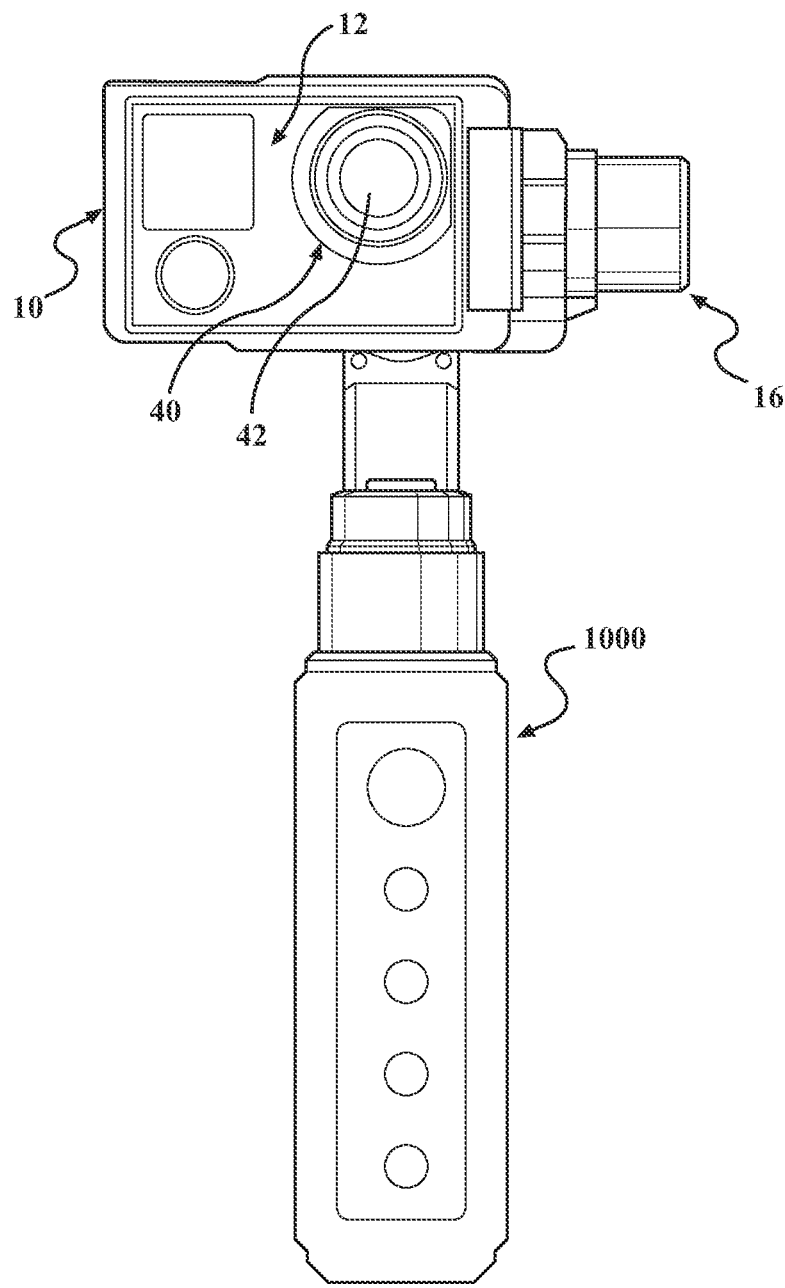
FIG. 1 is a rear view of a handheld apparatus shown in connection with an example DICD.
Figure 2:
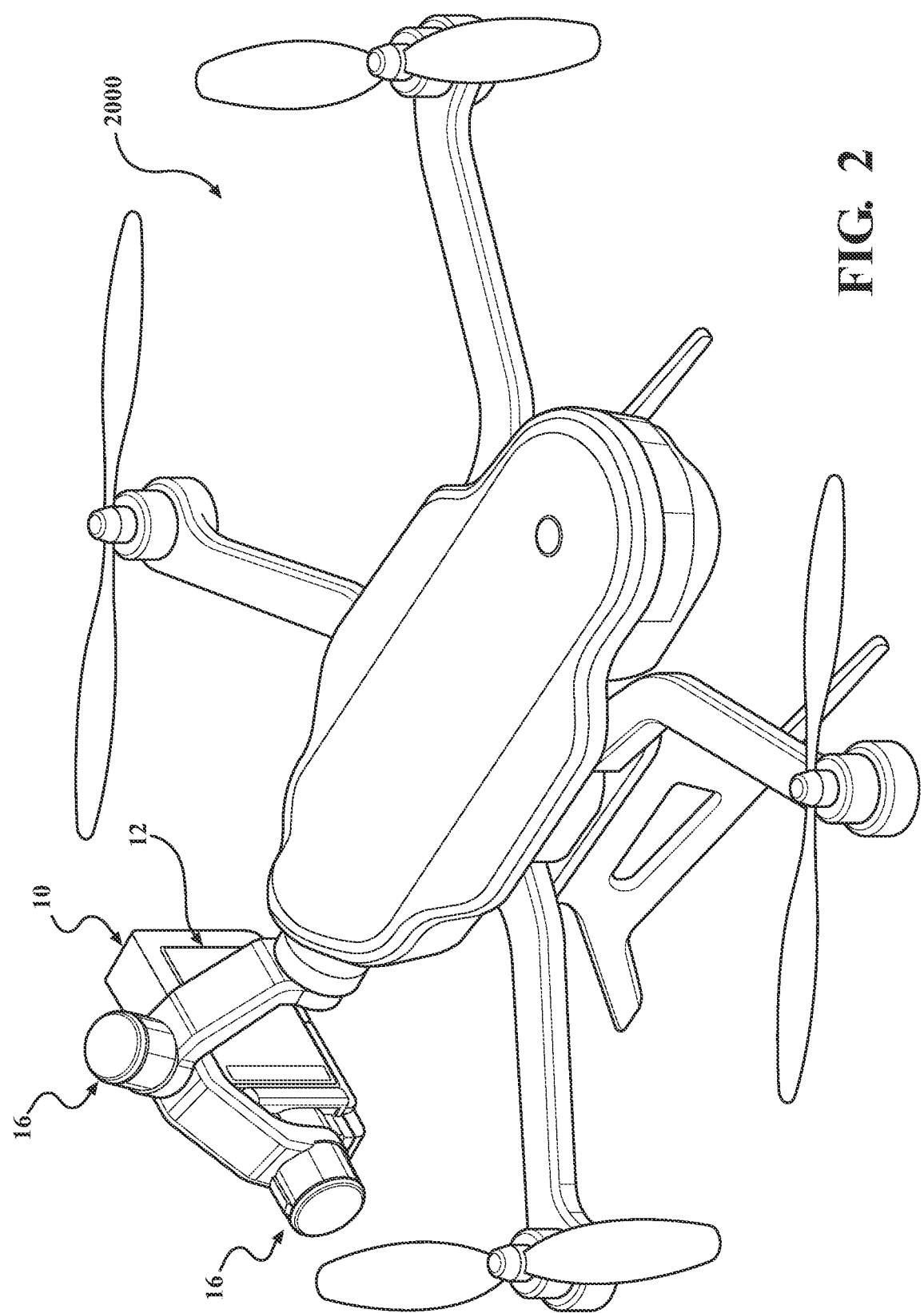
FIG. 2 is a top, perspective view of the DICD together with an example unmanned aerial vehicle.

With reference to FIGS. 1 and 2, an example DICD 10 is illustrated for use in capturing digital data including, for example, images, video, and audio. The principles of the present disclosure may find wide applicability in that the DICD 10 may be utilized in a variety of applications. For example, the DICD 10 may be incorporated into (or used with) a handheld apparatus 1000 (FIG. 1) or may be incorporated into (or used with) a vehicle (e.g., the unmanned aerial vehicle (UAV) 2000 seen in FIG. 2, an automobile, or a bicycle). The DICD 10 may also be configured for use in connection with a wearable support (not shown), such as a vest, a glove, a helmet, or a hat, or may simply be carried by a user.

Figure 3:
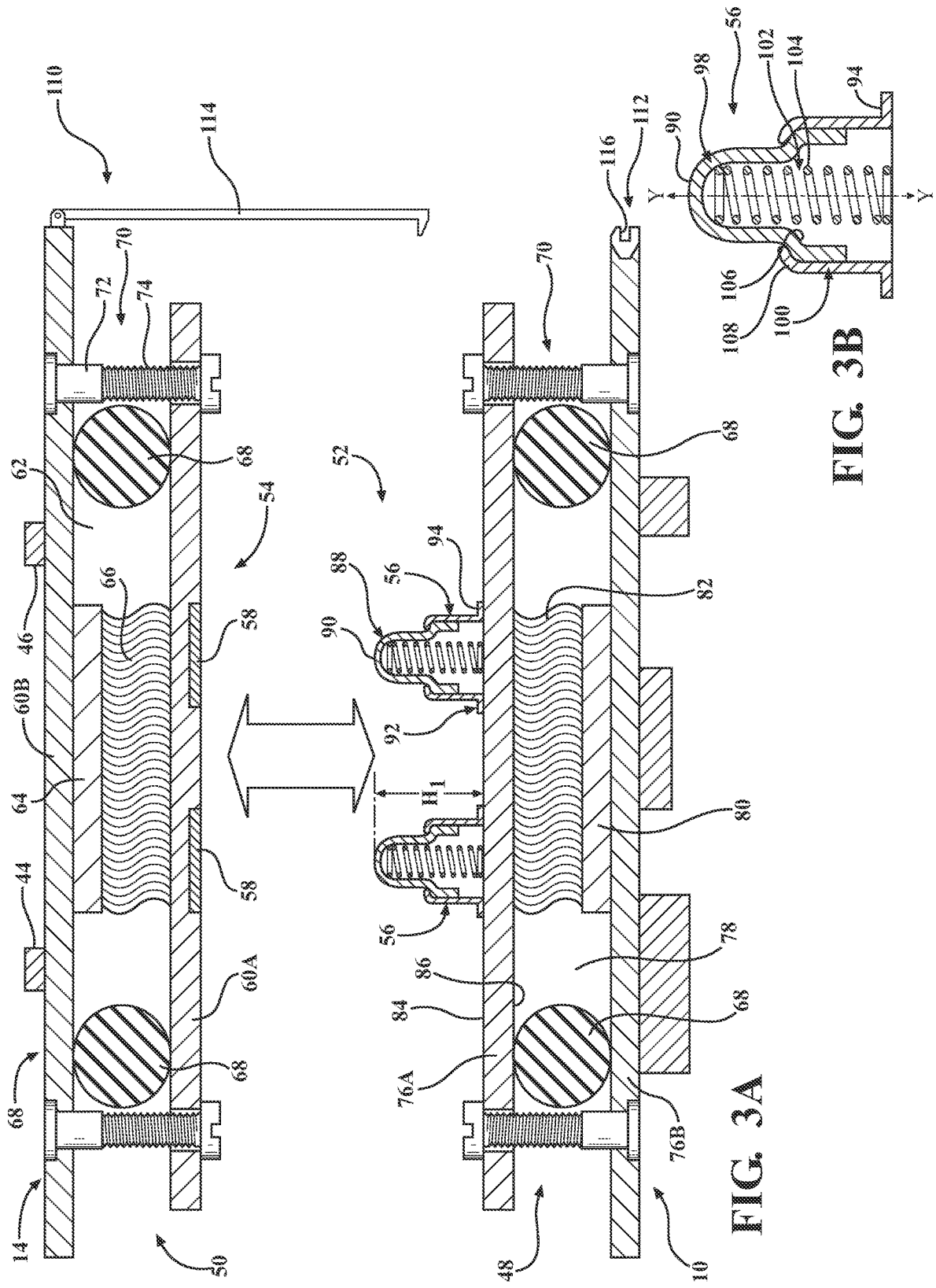
FIG. 3A is a partial, cross-sectional view of the DICD together with one embodiment of a detachable ISLA prior to connection of the DICD and the ISLA.
FIG. 3B illustrates one embodiment of a connector pin for use in establishing electrical connectivity between the DICD and the ISLA.
Figure 4:
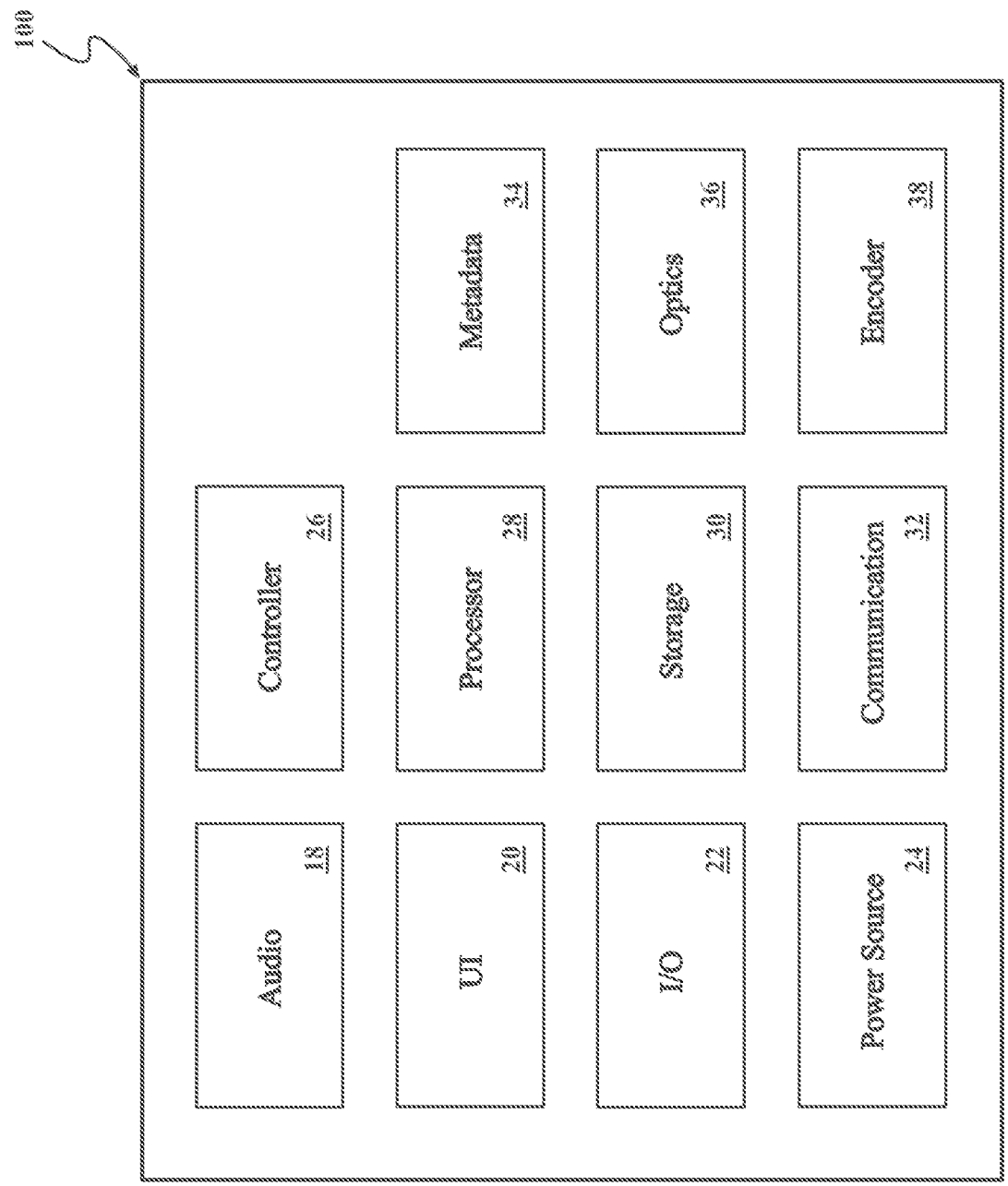
FIG. 4 is a schematic illustration of additional components of the DICD.

With reference to FIGS. 3A, 3B, and 4 as well, the DICD 10 includes a device body 12 and an ISLA 14 that is configured for releasable connection to the DICD 10. To increase image and/or video quality, in certain embodiments, the DICD 10 may also include one or more gimbal systems 16 (FIGS. 1, 2) to stabilize the DICD 10 during image and/or video capture by offsetting movement of the DICD 10. To facilitate the various functions of the DICD 10, the DICD 10 includes a variety of supporting components, such as, for example, an audio component 18 (FIG. 4), a user interface (UI) unit 20, an input/output (I/O) unit 22, a power source 24, a controller 26, a processor 28, an electronic storage unit 30, a communication unit 32, a metadata unit 34, an optics unit 36, and/or an encoder 38.

The ISLA 14 includes one or more optical element(s) 40 (FIG. 1), such as, for example, one or more lenses 42. In certain embodiments the ISLA 14 may also include an inertial measurement unit (IMU) 44 (FIG. 3A) and a sensor 46, suitable examples of which include a charge-coupled device (CCD) sensor, an active pixel sensor (APS), a complementary metal-oxide-semiconductor (CMOS) sensor, an N-type metal-oxide-semiconductor (NMOS) sensor, and/or any other image sensor or combination of image sensors.

The optical element(s) 40 (FIG. 1) have an associated field of view that extends in lateral and longitudinal directions. For example, the field of view may extend 90° in a lateral direction and 120° in a longitudinal direction. It should be appreciated, however, that the capabilities of the particular optical element(s) 40 employed in the DICD 10 may be varied in alternate embodiments to increase or decrease the field of view in the lateral direction and/or the longitudinal direction. Suitable optical element(s) 40 may include one or more macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, and perspective control lenses. In certain implementations of the DICD 10, multiple, overlapping fields of view may be employed to increase the capability of the DICD 10, such as through the use of two or more optical elements 40. For example, a first optical element 40 may be used to capture a first fisheye image (e.g., a round or elliptical image), which may be transformed into a first rectangular image, and a second optical element 40 may be used to capture a second fisheye image (e.g., a round or elliptical image), which may be transformed into a second rectangular image. The first and second rectangular images may then be arranged side by side to create overlapping portions that can be stitched together to form a single planar image.

Figure 5:
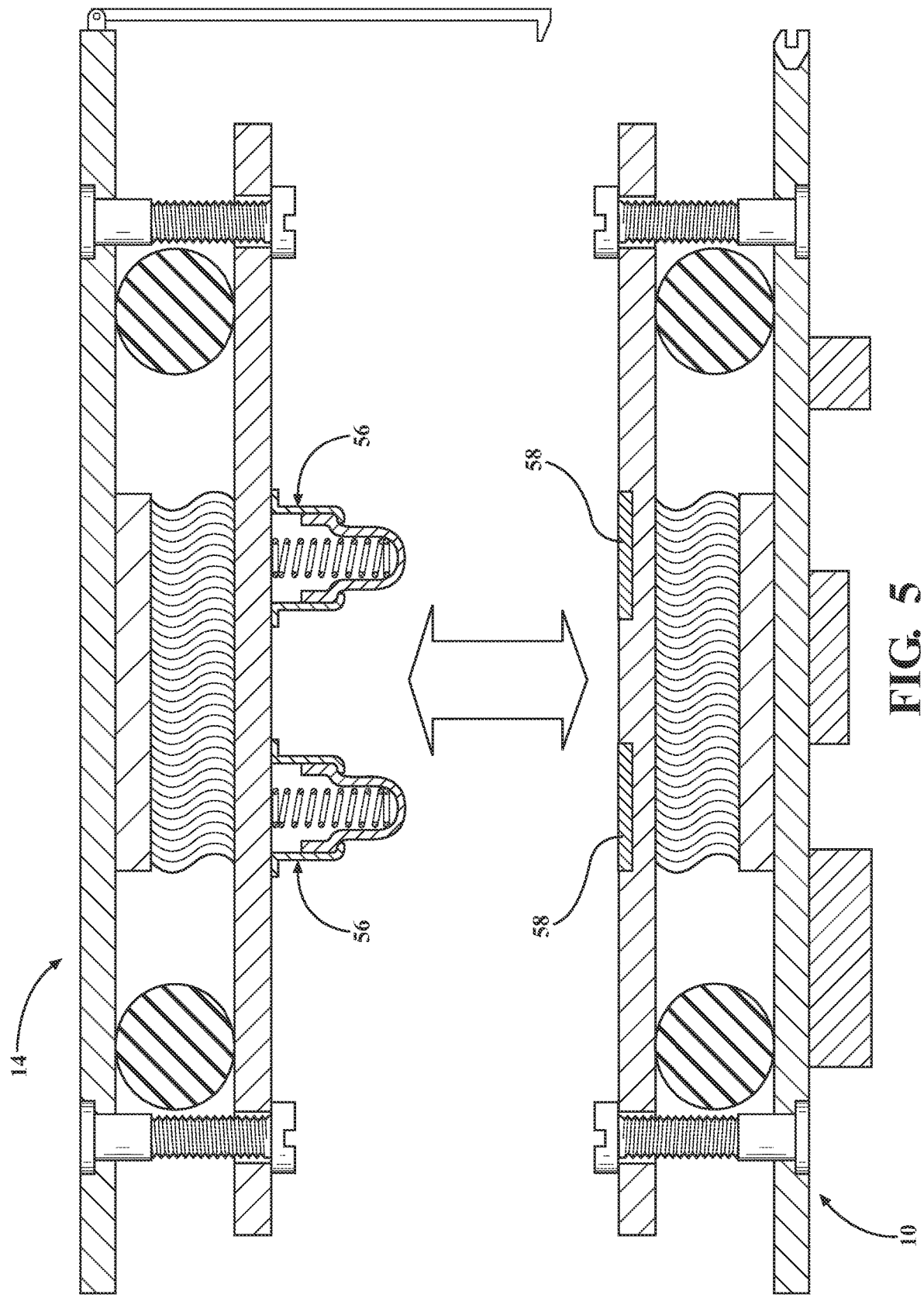
FIG. 5 is a partial, cross-sectional view of an alternate embodiment of the DICD together with an alternate embodiment of the detachable ISLA.
Figure 6:
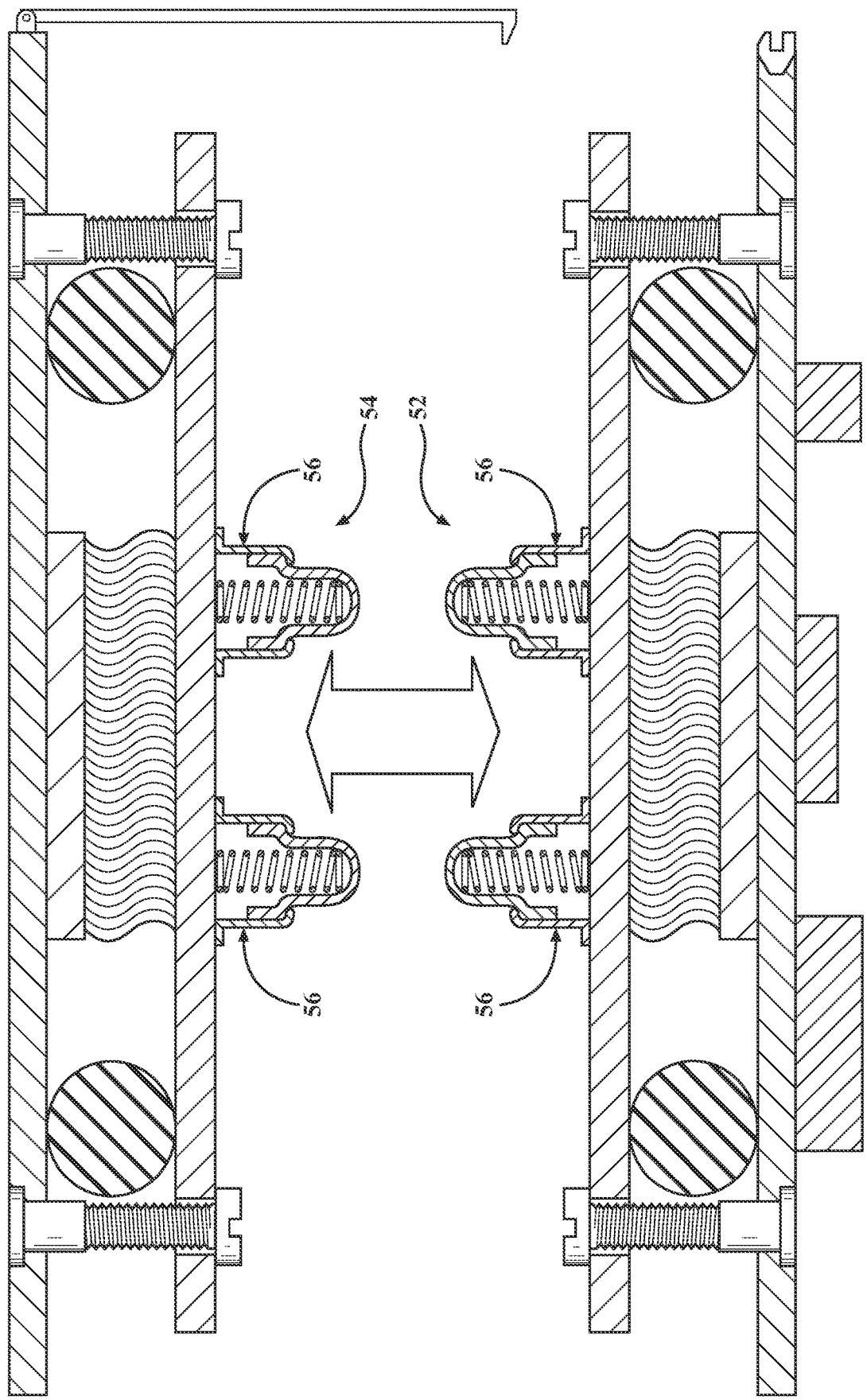
FIG. 6 is a partial, cross-sectional view of the embodiment of the DICD seen in FIG. 3A together with an alternate embodiment of the detachable ISLA.

To facilitate electrical communication between the DICD 10 and the ISLA 14 and, thus, connection and disconnection of the ISLA 14 and the DICD 10, the DICD 10 and the ISLA 14 include PCB assemblies 48, 50 (FIG. 3A) with corresponding electrical contacts 52, 54, respectively. More specifically, in the illustrated embodiment, the electrical contact 52 provided on the DICD 10 includes a plurality of connector pins 56 and the electrical contact 54 provided on the ISLA 14 includes one or more connective surfaces 58 that are configured and positioned for contact with the connector pins 56. It should be appreciated, however, that in alternate embodiments, the connector pins 56 may be provided on the ISLA 14 and the connective surface(s) 58 may be provided on the DICD 10, as illustrated in FIG. 5, without departing from the scope of the present disclosure. Additionally, embodiments in which the connective surface(s) 58 are supplemented or replaced by one or more connector pins 56 (i.e., such that the electrical contacts 52, 54 include corresponding connector pins 56 that are positioned for contact) are also contemplated herein, as illustrated in FIG. 6.

With reference again to FIG. 3, the PCB assembly 50 provided on the ISLA 14 includes a pair of layered PCBs 60A, 60B that are separated so as to define an internal space 62 that is configured to accommodate various supportive structures and/or circuitry. For example, in the illustrated embodiment, the internal space 62 receives a flexible printed circuit (FPC) 64 and cable 66 (which may support a variety of electrical functions), as well as one or more dampeners 68 that are adapted to prevent the intrusion of moisture/debris and/or absorb forces and vibrations to which the ISLA 10 may be subjected during use. The dampener(s) 68 may be generally annular (e.g., toroidal) in cross-sectional configuration, and may include (e.g., may be formed from) any suitable material, such as, for example, polycarbonate, acrylonitrile-butadiene styrene (ABS), polyvinyl chloride (PVC), thermoplastic elastomer, silicone, rubber(s), and polymer(s). It is envisioned that the dampeners 68 may be formed through any suitable manufacturing process, such as, for example, injection molding and/or coating.

The particular material(s) used in the construction of the dampeners 68 may be varied depending, for example, upon the particular intended use of the DICD 10 or the amount of dampening that may be required. For example, the dampeners 68 may be designed to eliminate all frequencies above a particular threshold (e.g., 1 kHz). In circumstances or environments in which the ISLA 14 may be subjected to higher forces and/or frequencies, the dampeners 68 may include (e.g., may be formed from) harder material(s) having a higher durometer within the range of approximately 80D to approximately 100D. In circumstances or environments in which the ISLA 14 may be subjected to lower forces and/or frequencies, however, the dampeners 68 may include (e.g., may be formed from) softer material(s) having a lower durometer within the range of approximately 10D to approximately 20D.

The PCBs 60A, 60B are connected to one another by fasteners 70. In one embodiment, it is envisioned that the fasteners 70 may be configured to permit disconnection of the PCB 60A from the PCB 60B. For example, as seen in FIG. 3A, the fasteners 70 may include a threaded base 72 and a threaded shaft 74 that is insertable into the threaded base 72. By permitting disconnection of the PCBs 60A, 60B, various components of the ISLA 14 (e.g., the dampener(s) 68, the FPC 64, and/or the cable 66) may be removed, for example, to allow for repair and/or replacement.

Figure 7:
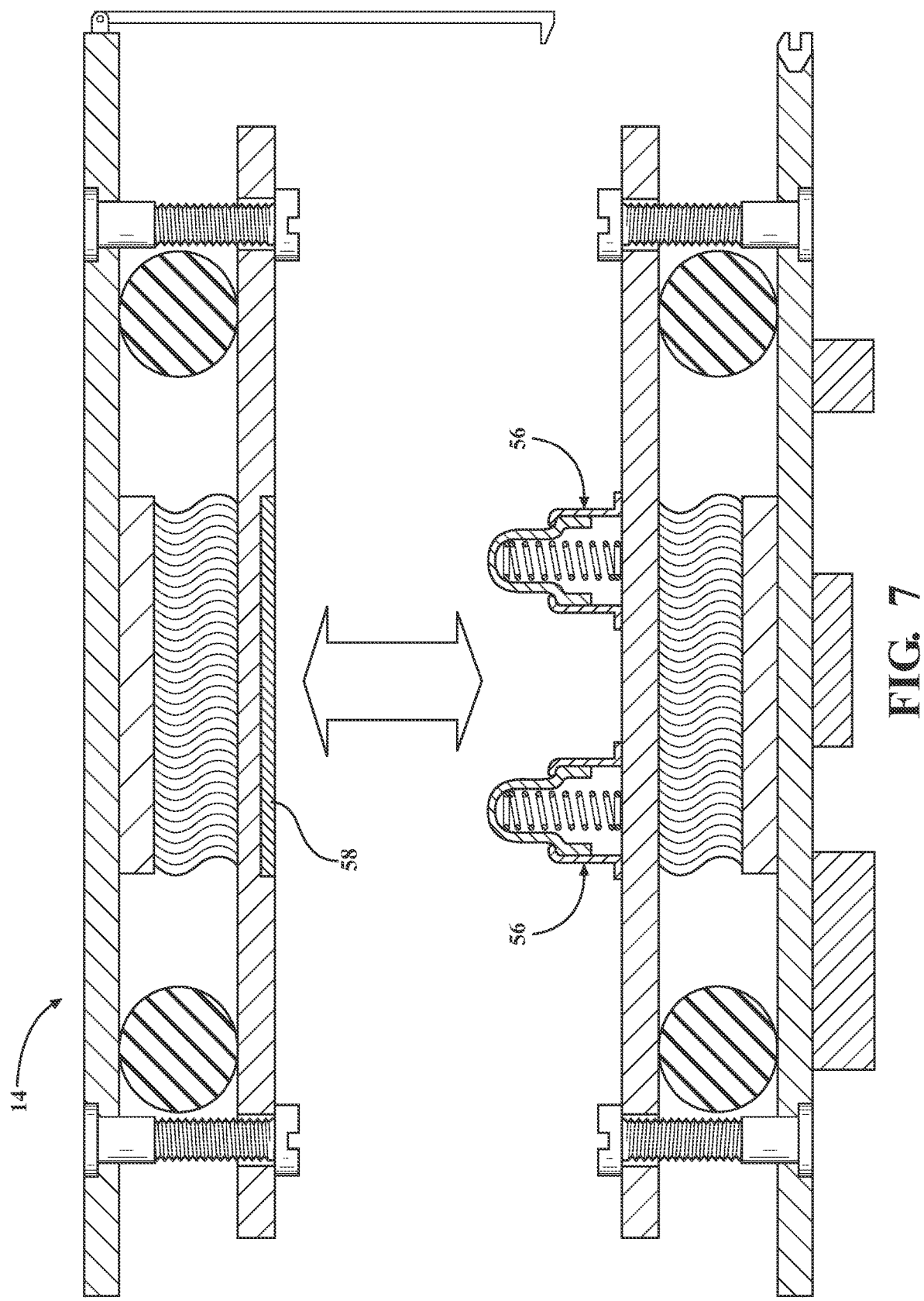
FIG. 7 is a partial, cross-sectional view of the embodiment of the DICD seen in FIG. 3A together with another embodiment of the detachable ISLA.

The connective surface(s) 58 on the ISLA 14 include (e.g., are formed partially or entirely from) a conductive material, such as gold, for example. In certain embodiments, it is envisioned that the conductive material may be applied to a base material (either conductive or non-conductive in nature), whereby the conductive material forms a coating thereon. In other embodiments, however, it is envisioned that the connective surface(s) 58 may be formed entirely from the conductive material. The connective surface(s) 58 may be embedded within the PCB 60A, as illustrated in FIG. 3A, or alternatively, the connective surface(s) 58 may be surface-mounted to the PCB 60A. In the embodiment seen in FIG. 3A, the ISLA 14 includes multiple, discrete connective surfaces 58 that correspond in number, configuration, and position to the connector pins 56 provided on the DICD 10. In alternate embodiments, however, the particular number, configuration, and/or position of the connective surfaces 58 may be varied. For example, the ISLA 14 may include a single connective surface 58 that is configured and positioned for contact with each of the connector pins 56, as seen in FIG. 7.

With continued reference to FIG. 3A, the PCB assembly 48 provided on the DICD 10 will be discussed. The PCB assembly 48 may be connected to the DICD 10 in any suitable manner and in any suitable location, such as, for example, to the device body 12 (FIG. 1) of the DICD 10. The PCB assembly 48 includes a pair of layered PCBs 76A, 76B that are separated so as to define an internal space 78. As discussed above in connection with the ISLA 14, the internal space 78 is configured to accommodate various support structures and/or circuitry (e.g., an FPC 80, a cable 82, and one or more dampeners 68), and the PCBs 76A, 76B are connected by fasteners 70 that allow for disconnection of the PCB 76A from the PCB 76B to permit the removal and/or replacement of various components of the DICD 10 (e.g., the dampener(s) 68, the FPC 80, and/or the cable 82).

Figure 8:
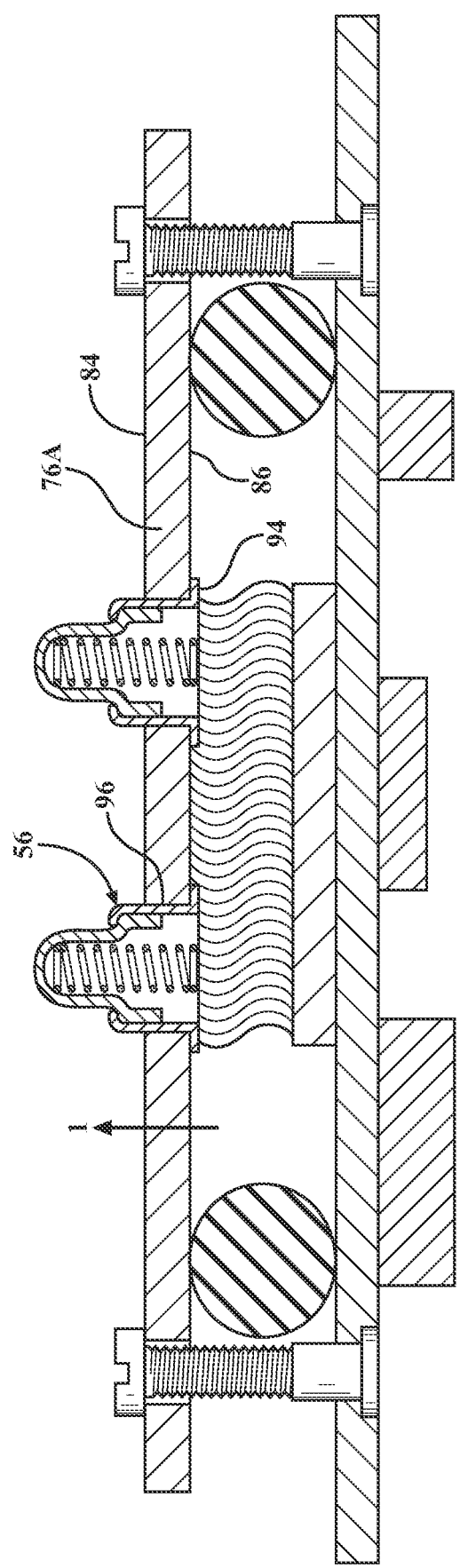
FIG. 8 is a partial, cross-sectional view of another embodiment of the DICD seen in FIG. 3A.

As seen in FIG. 3A, the PCB 76A supports the connector pins 56 and includes opposing first and second sides 84, 86, respectively. More specifically, the first side 84 of the PCB 76A faces outwardly (i.e., towards the ISLA 14), and the second side 86 faces inwardly (i.e., away from the ISLA 14). Each of the connector pins 56 includes a first end 88 defining a connective surface 90 and a second, opposing end 92, which, in the illustrated embodiment, defines a flange 94. It is envisioned that the connector pins 56 may be surface-mounted to the PCB 76A such that the second end 92 of the connector pins 56 extends from the first side 84 of the PCB 76A. In such embodiments, it is envisioned that the second end 92 of the connector pins 56 may be flush-mounted to PCB 76A, as seen in FIG. 3A. Alternatively, as seen in FIG. 8, it is envisioned that the connector pins 56 may be positioned within apertures 96 extending through the PCB 76A (i.e., from the first side 84 through to the second side 86), which may be formed through any suitable method of manufacture (e.g., drilling). In such embodiments, it is envisioned that the connector pins 56 may be secured within the apertures 96 in any suitable manner. For example, the connector pins 56 may be adhesively secured within the apertures 96 or soldered in place, both inside the apertures 96 and/or at the locations where the connector pins 56 meet the opposing sides 84, 86 of the PCB 76A to thereby preserve the position of the connector pins 56 in the event that one point of contact with the PCB 76A fails. Additionally, or alternatively, it is envisioned that the connector pins 56 may be positioned within the apertures 96 in an interference fit.

In the embodiment seen in FIG. 8, during assembly of the PCB 76A and the connector pins 56, each connector pin 56 is rear-mounted and inserted into one of the apertures 96. More specifically, the connector pins 56 are inserted through the second side 86 of the PCB 76A in the direction indicated by arrow 1 and are advanced towards the first side 84 until the flange 94 engages the second side 86. As seen in FIG. 8, each of the flanges 94 defines a transverse cross-sectional dimension (e.g., width) larger than the transverse cross-sectional dimension (e.g., diameter) defined by the apertures 96, for example, to assist in assembly and/or create additional surface area for contact with the PCB 76A.

Securing the connector pins 56 within the apertures 96 allows for increased resistance to (and tolerance of) lateral (e.g., shearing) forces that may be applied during connection and disconnection of the ISLA 14 and the DICD 10, as well as torsional stability, when compared to surface-mounted embodiments. More specifically, by securing the connector pins 56 within the apertures 96, applied lateral forces can be absorbed and resisted by the PCB 76A, rather than by the connection (e.g., adhesive and/or solder) between the connector pins 56 and the PCB 76A, which may allow for the use of longer connector pins 56 in certain embodiments of the disclosure.

Figure 9:
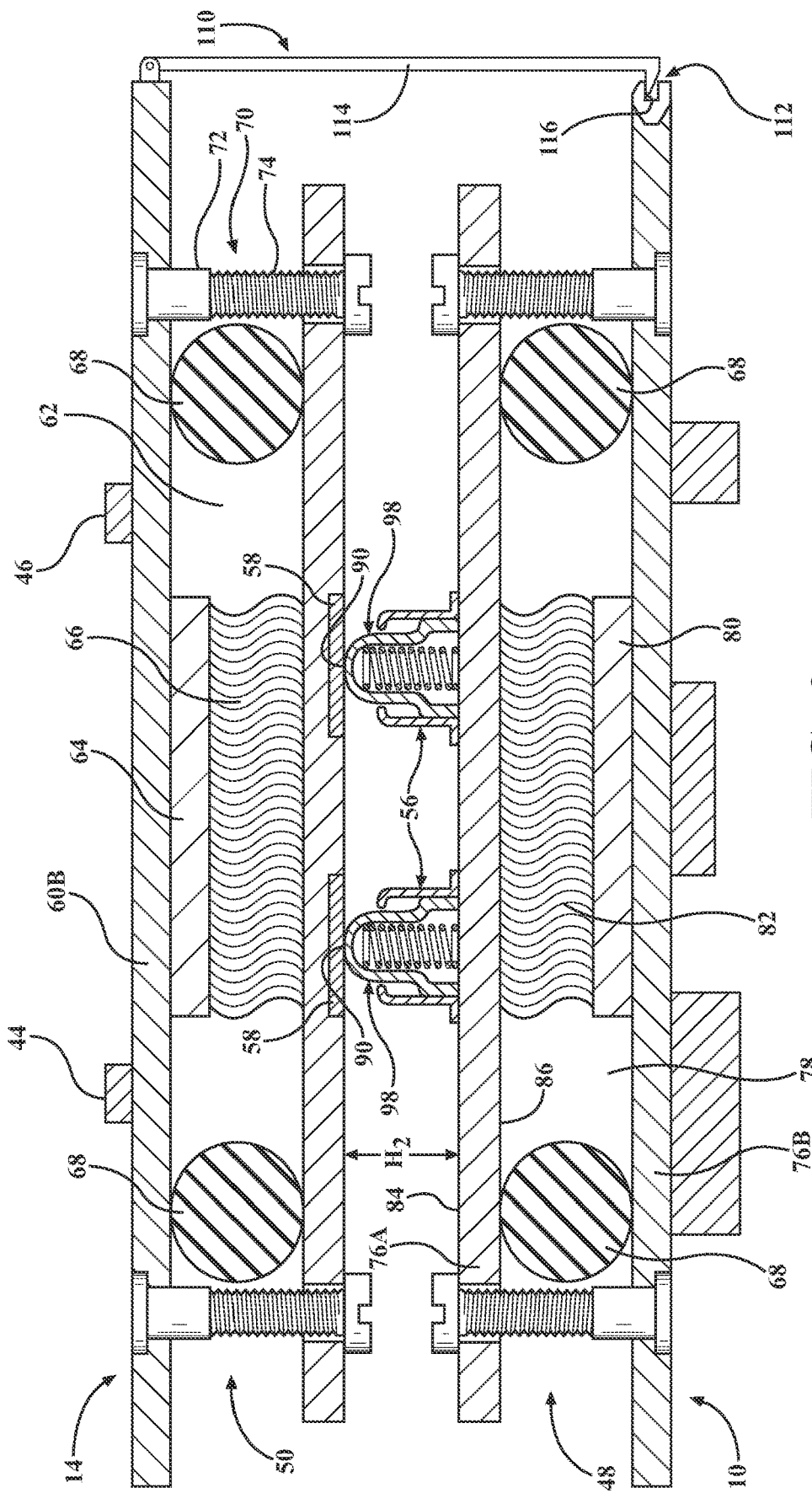
FIG. 9 is a partial, cross-sectional view of the DICD and the ISLA seen in FIG. 3A after connection of the DICD and the ISLA.

With reference now to FIGS. 3A, 3B, and 9, each of the connector pins 56 includes an inner member 98, an outer member 100, and a biasing member 102 (e.g., a spring 104), and is reconfigurable between a first (normal) configuration (FIG. 3A), in which the connector pins 56 define a first height H1, and a second (compressed) configuration (FIG. 9) in which the connector pins 56 define a second height H2 that is less than the first height H1. The connector pins 56 are moved from the first configuration into the second configuration upon connection of the DICD 10 and the ISLA 14, which compresses the biasing member 102 to create (or increase) a biasing force directed outwardly (i.e., towards the ISLA 14), and are returned to the first configuration upon disconnection of the DICD 10 and the ISLA 14 via the biasing force in the biasing member 102.

The inner and outer members 98, 100 include corresponding beveled surfaces 106, 108, respectively, that are configured for engagement in the first configuration (FIG. 3A) to maintain assembly of the connector pins 56. Although the beveled surfaces 106, 108 are illustrated as extending at an angle of approximately 45° in relation to a central axis Y of the connector pins 56, it should be appreciated that the particular configuration of the beveled surfaces 106, 108 may be varied in alternate embodiments of the disclosure. Thus, embodiments in which the beveled surfaces 106, 108 extend at an angle greater or less than 45° would not be beyond the scope of the present disclosure.

The inner member 98 of each connector pin 56 defines the connective surface 90, which includes (e.g., is formed partially or entirely from) a conductive material, such as gold, for example. As discussed above in connection with the ISLA 14, the conductive material may be applied to a base material as a coating, or the connective surface 90 may be formed entirely from the conductive material. Upon connection of the DICD 10 and the ISLA 14, the connective surfaces 90 on the connector pins 56 contact the connective surface(s) 58 on the DICD 10 to facilitate the communication of electrical signals (e.g. data, power, command/control signals, image sensor data, and/or identification information) between the DICD 10 and the ISLA 14 (e.g., between the FPCs 64, 80 and/or the cables 66, 82). Upon connection of a particular ISLA 14, for example, the ISLA 14 may communicate an identification signal to the DICD 10 (e.g., to the controller 26) such that the DICD 10 can calibrate and adapt to the particular ISLA 14.

Although shown and described throughout the present disclosure in the form of connector pins 56, it should be appreciated that the specific configuration of the electrical contact 52 (or the electrical contact 54) may be varied in alternate embodiments of the present disclosure. For example, in an alternate embodiment, it is envisioned that the connector pins 56 may be replaced by one or more USB-style connectors.

As indicated above, the present disclosure contemplates and provides for interchangeability between ISLAs 14, the election of which may be dependent upon the particular intended use of the DICD 10. For example, when the DICD 10 is to be used in wet environments (e.g., underwater, rainy, or humid environments), the user may elect to connect one ISLA 14, whereas when used in dry environments, the user may elect to connect another ISLA 14. Upon selecting a particular ISLA 14, the ISLA 14 is connected to the DICD 10, which results in compression of the connector pins 56 and the establishment of electrical communication between the ISLA 14 and the DICD 10. Connection between the DICD 10 and the ISLA 14 may be maintained through any suitable structure(s) or mechanism(s). For example, as seen in FIGS. 3A and 9, the ISLA 14 and the DICD 10 may include corresponding locking members 110, 112, respectively, that are configured for releasable engagement. Although shown as a locking arm 114 and a recess 116 configured to receive the locking arm 114 in the illustrated embodiment, it should be appreciated that the locking members 110, 112 may include any structure(s), mechanism(s), or combination thereof suitable for the intended purpose of releasably connecting the ISLA 14 and the DICD 10 (e.g., mechanical interlocks, detents, and/or latches engageable in snap-fit relation, in an interference fit, etc.).

When the interchange between ISLAs 14 is desired, the user can disengage the locking members 110, 112 and disconnect the ISLA 14. Upon disconnection of the ISLA 14 and separation from the DICD 10, the connector pins 56 are returned to the first (normal) configuration seen in FIG. 3A by the biasing members 102. The connection process described above can then be repeated with a different ISLA 14 if necessary or desired.

Figure 10:
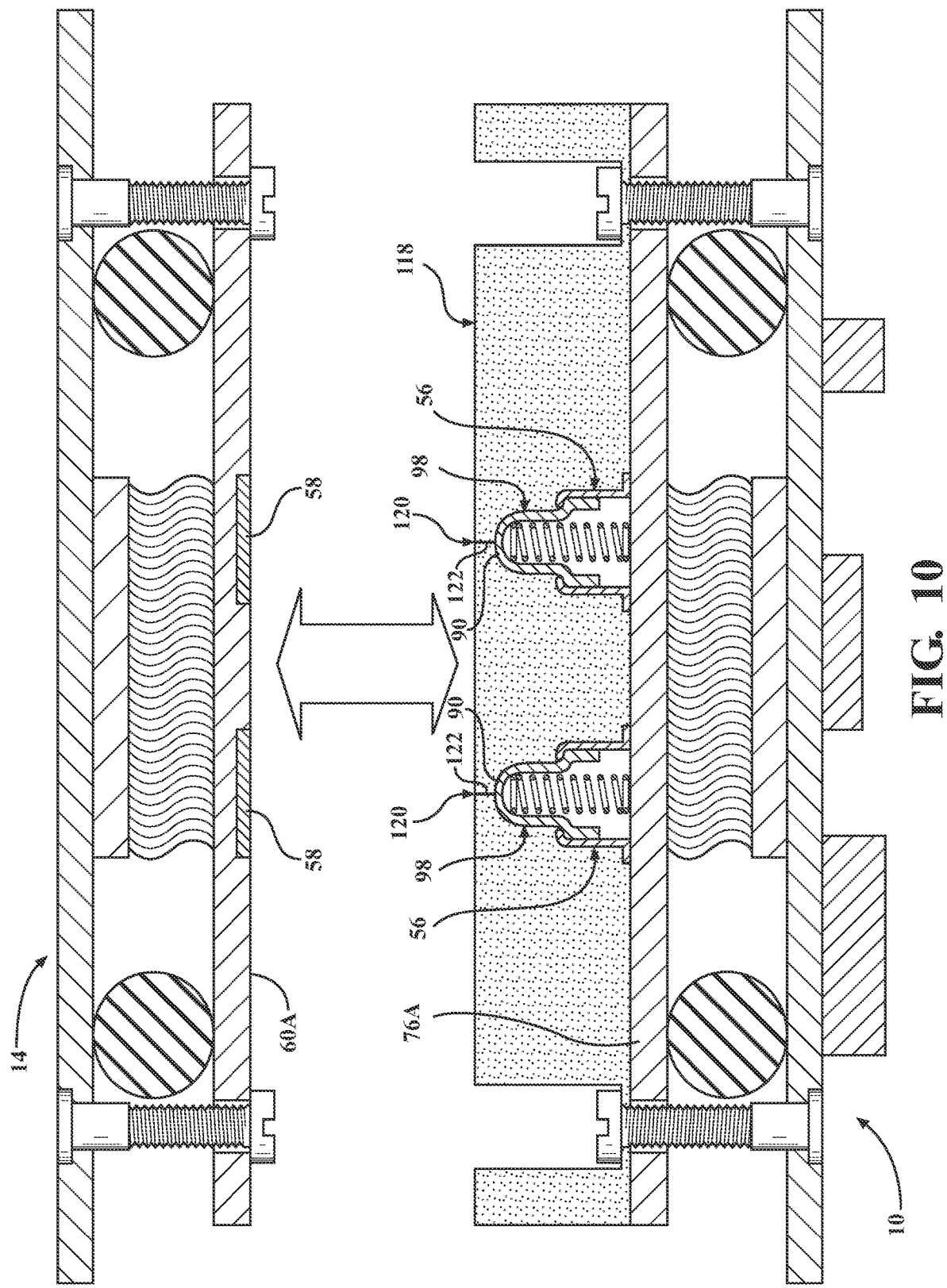
FIG. 10 is a partial, cross-sectional view of the DICD and the ISLA seen in FIG. 3A together with one embodiment of a sealing member prior to connection of the DICD and the ISLA.
Figure 11:
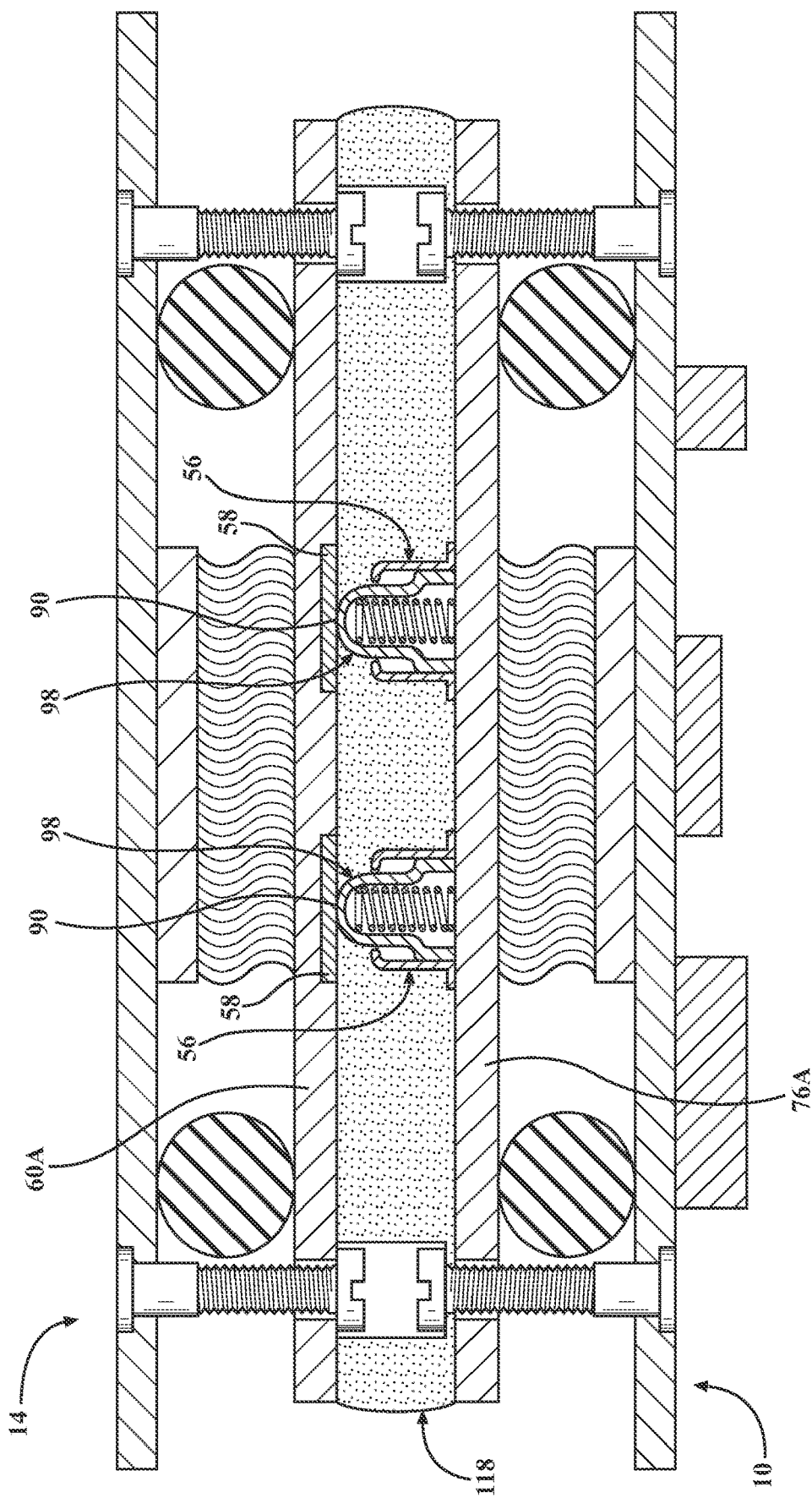
FIG. 11 is a partial, cross-sectional view of the DICD, the ISLA, and the sealing member seen in FIG. 10 after connection of the DICD and the ISLA.

With reference now to FIGS. 10 and 11, as discussed above, during use of the ISLA 14 and the DICD 10 in wet and/or underwater environments, over time, the collection or presence of water or other such moisture may result in (or advance) corrosion via the formation of a continuous electrical path between adjacent connector pins 56 (i.e., such that one connector pin 56 acts as a cathode and another connector pin 56 acts as an anode). Additionally, the presence of debris (such as sand, dirt, or dust, for example) may degrade performance and connectivity over time, thus shortening the lifespan of the product. To address these concerns, it is envisioned that the DICD 10 may include a sealing member 118 that is configured to protect the connector pins 56 by inhibiting (or entirely preventing) the collection of water/moisture about the connector pins 56 and/or the entry of debris.

The sealing member 118 may be formed from any suitable, resiliently compressible material, such as a closed-cell silicon foam, for example, and may be formed through any suitable manufacturing process (e.g., cutting and/or stamping). The sealing member 118 is connected to the PCB 76A and may be secured thereto in any suitable manner. For example, the sealing member 118 may be connected to the PCB 76A through the use of mechanical connectors (e.g., the fasteners 70), as shown in FIGS. 10 and 11, and/or through the use of one or more adhesives.

The sealing member 118 is configured and positioned to sealingly engage the connector pins 56 without interfering with electrical conductivity between the DICD 10 and the ISLA 14 upon connection. More specifically, the sealing member 118 includes one or more openings 120 (FIG. 10) that are positioned in general alignment with the connector pins 56 and allow the connector pins 56 to extend through the sealing member 118 and contact the connective surface(s) 58 on the ISLA 14. Although illustrated as slits 122 in the embodiment seen in FIG. 10, it is envisioned that the particular configuration of the opening(s) 120 may be varied in alternate embodiments of the disclosure. For example, the opening(s) 120 may instead be configured as apertures, which may assume any suitable geometric configuration (e.g., circular or elliptical, for example). The opening(s) 120 in the sealing member 118 may be formed in any suitable manner, such as by cutting. In one particular method, it is envisioned that the opening(s) 120 may be formed using a heated tool, such as a knife, probe, or other such instrument, to form smooth edges about the opening(s) 120.

In the illustrated embodiment, the slits 122 are normally closed (e.g., by the resilient material comprising the sealing member 118) to inhibit (or entirely prevent) water/moisture and/or debris from coming into contact with (or collecting around) the connector pins 56 prior to connection of the ISLA 14 and the DICD 10. Upon connection of the DICD 10 and the ISLA 14, however, the sealing member 118 is moved from a first (uncompressed) configuration (FIG. 10), in which the connector pins 56 are concealed within the sealing member 118, into a second (compressed) configuration (FIG. 11), in which the connection pins 56 are at least partially exposed from the sealing member 118. More specifically, as the sealing member 118 is compressed, the opening(s) 120 are forced open by the connector pins 56, which allows the connective surfaces 90 on the inner members 98 to extend beyond the sealing member 118, as seen in FIG. 11, and contact the connective surface(s) 58 on the ISLA 14 to establish an electrical connection between the DICD 10 and the ISLA 14 in the manner discussed above. Upon disconnection of the DICD 10 and the ISLA 14, the sealing member 118 is allowed to expand, during which expansion, the inner surfaces of the sealing member 118 defined by the opening(s) 120 may traverse the outer surfaces of the connector pins 56 to displace, expel, or otherwise remove water/moisture (e.g., sweat) and/or debris from the connector pins 56.

Figure 12:
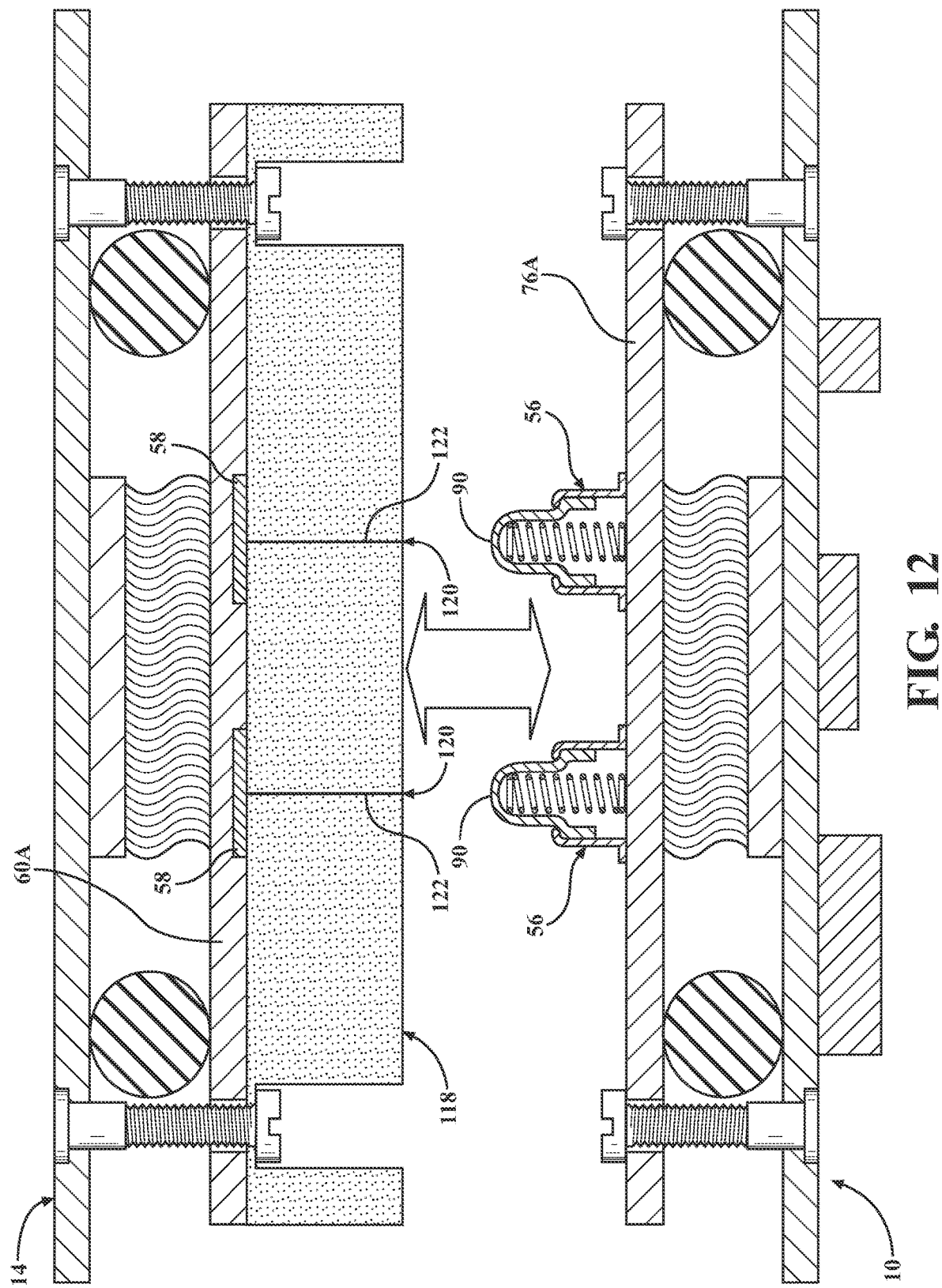
FIG. 12 is a partial, cross-sectional view of the DICD, the ISLA, and the sealing member seen in FIG. 10 prior to connection of the DICD and the ISLA with the sealing member shown in a different orientation.

Although discussed in association with the DICD 10, in alternate configurations, the sealing member 118 may be associated with the ISLA 14, as seen in FIG. 12. In such embodiments, upon connection of the ISLA 14 and the DICD 10, the connector pins 56 are inserted into the opening(s) 120 (e.g., the slit(s) 122) formed in the sealing member 118. The opening(s) 120 are thus forced open to permit contact between the connective surfaces 90 on the connector pins 56 and the connective surface(s) 58 on the ISLA 14 to establish electrical connectivity, during which the sealing member 118 displaces/removes water/moisture and/or debris from the connector pins 56.

To further inhibit the intrusion of water/moisture, the DICD 10 (and/or the ISLA 14) may include one or more fluid-resistant or hydrophobic materials (e.g., rubber(s) or polymeric materials. For example, such material(s) may be incorporated into the sealing member 118 during manufacture or may be applied to the sealing member 118 as a coating. Additionally, or alternatively, it is envisioned that a hydrophobic coating may be applied to the connector pins 56, and/or the PCBs 76A, 76B (as well as any other suitable component) to discourage the collection or pooling of water/moisture in a manner that would result in the formation of an electrical path between adjacent pins 56, thereby mitigating corrosion (as discussed in further detail below). For example, the sealing member 118 and/or the hydrophobic coating may cause water/moisture to bead and thereby frustrate the formation of a continuous electrical path.

Figure 13:
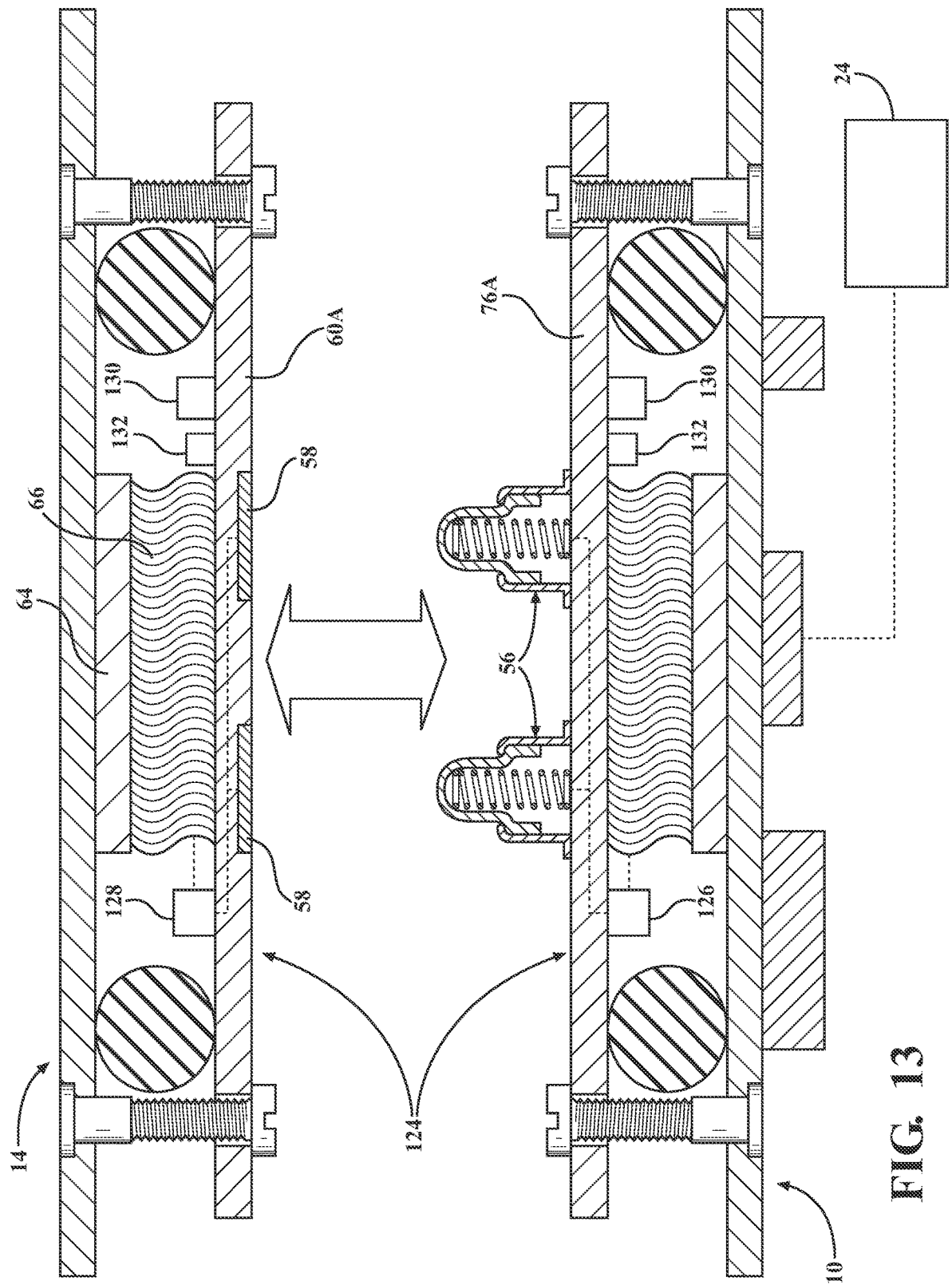
FIG. 13 is a partial, cross-sectional view of another embodiment of the disclosure including a converter system for use in the mitigation of corrosion.
Figure 14:
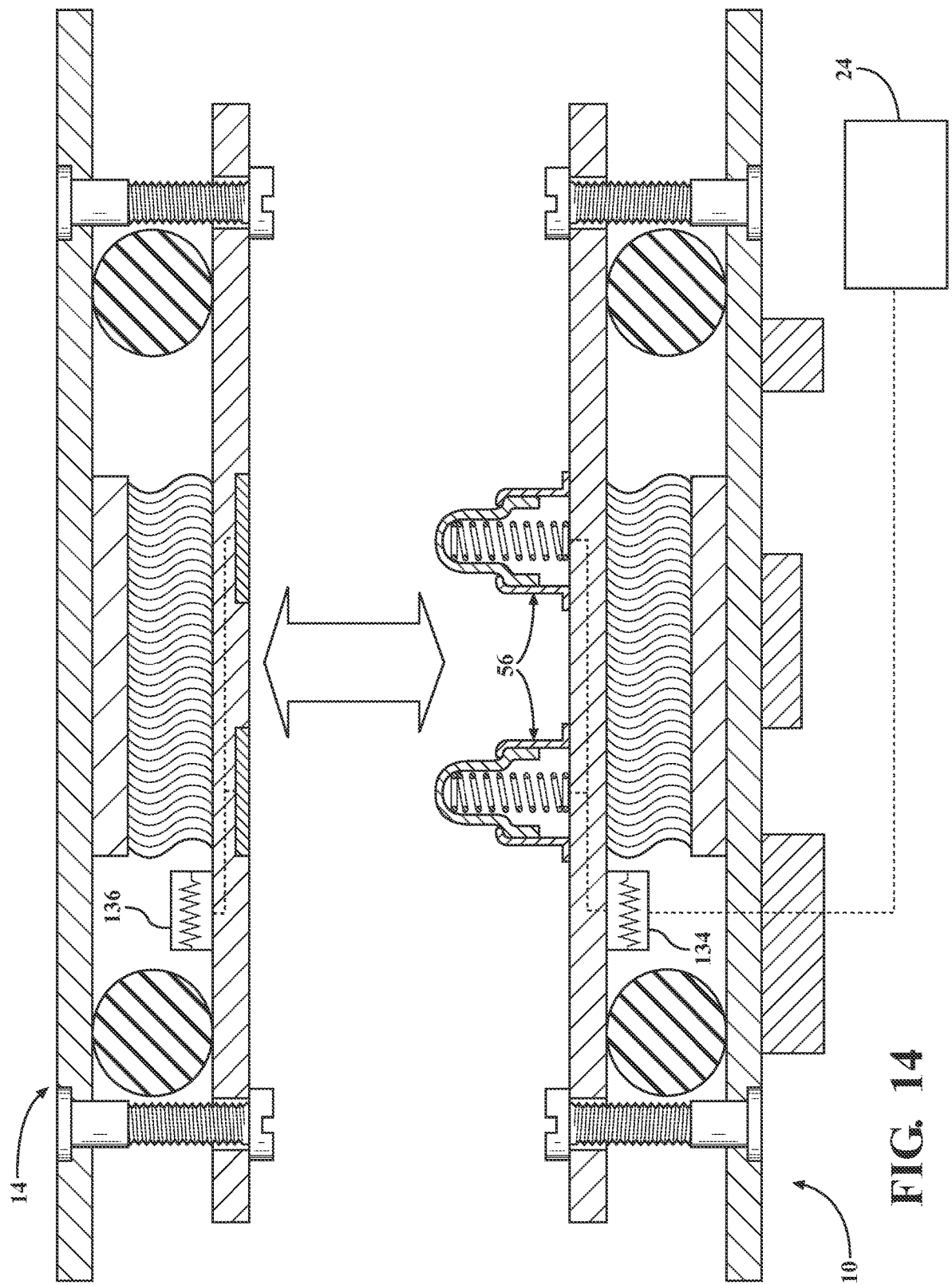
FIG. 14 is a partial, cross-sectional view of another embodiment of the disclosure including commutation and decommutation circuits for use in the mitigation of corrosion.

With reference now to FIGS. 13 and 14, alternate embodiments of the disclosure will be discussed, which include various additional components that are configured to mitigate the corrosion of electrical contacts. When electrical contacts, such as the connector pins 56, are in contact with an electrolytic solution (e.g. water/moisture) and are oppositely polarized with sufficient voltage, corrosion may occur, the rate of which decreases with voltage potential.

FIG. 13 illustrates an embodiment of the disclosure including a converter system 124 that is configured to vary the voltage/current from the power source 24 of the DICD 10 across the connector pins 56. The converter system 124 includes a first converter 126 (e.g., a buck-converter) associated with the DICD 10 that is configured to decrease voltage across the connector pins 56 (i.e., on the supply side), and a second converter 128 (e.g., a boost-converter) associated with the ISLA 14 that is configured to restore (or increase) the voltage (i.e., on the load side). Although shown as being positioned on PCB assemblies 48, 50, respectively, it should be appreciated that the particular location of the converters 124, 126 may be varied in alternate embodiments of the disclosure.

During use of the DICD 10 and the ISLA 14, the first converter 126 reduces the voltage/current from the power source 24 prior to reaching the connector pins 56 (i.e., power is reduced from an initial level to a subsequent, converted level). By reducing voltage/current flowing to the connector pins 56, corrosion resulting from the flow of power between adjacent connector pins 56 can be reduced, slowed, or entirely prevented. After flowing through the connector pins 56 to the connective surface(s) 58 on the ISLA 14, the converted voltage/current is received by the second converter 128, which increases the power of the signal (e.g., the voltage/current is returned to the initial level or other such suitable or requisite measurement) prior to reaching the circuitry of the ISLA 14 (e.g., the FPC 64 and/or the cable 66). The converters 124, 126 thus allow for a reduction in power across the connector pins 56 without realizing an effective drop in voltage/current between the power source 24 and the circuitry of the ISLA 14 that would have a significant negative impact on operation of the DICD 10 and the ISLA 14.

Due to incidental heating of the DICD 10, the ISLA 14, and/or the converters 124, 126, water/moisture (e.g., sweat) may naturally evaporate during operation, thereby breaking the electrical path established between adjacent connector pins 56 by such water/moisture and obviating the need to manipulate the voltage using the converters 124, 126. In certain embodiments, to facilitate evaporation, it is envisioned that such incidental heat may be conducted to the connector pins 56 and/or the connective surface(s) 58 on the ISLA 14. Additionally, or alternatively, one or more heating elements 130 may be provided, as seen in FIG. 13, to increase the rate at which evaporation occurs and thereby reduce any requisite need for operation of the converters 124, 126 to improve the overall efficiency of the system. Although shown as being associated with the DICD 10 in FIG. 13, it should be appreciated that the heating element 130 may be positioned in any suitable location, and, as such, that the particular location of the heating element 130 may be varied in alternate embodiments of the disclosure.

To monitor and address evaporation, the DICD 10 may include one or more bypass sensors 132 (e.g., a circuit or the like) that are in communication with the connector pins 56 and/or the connective surface(s) 58. In such embodiments, the sensor(s) 132 may be configured to detect the presence of water/moisture proximate (e.g., adjacent to, near, or in contact with) the connector pins 56 (and/or the connective surfaces 58) and/or an electrical current between connector pins 56 (and/or the connective surfaces 58). Although illustrated as being positioned on the PCBs 60A, 76A in the embodiment seen in FIG. 13, as with the heating element 130, it should be appreciated that the bypass sensor(s) 132 may be positioned in any suitable location, and, thus, that the particular location of the bypass sensor(s) 132 may be varied in alternate embodiments of the disclosure.

Upon detecting the presence of water/moisture (and/or an electrical current) between the connector pins 56 and/or the connective surface(s) 58, the bypass sensor(s) 132 may transmit a signal (e.g., to the controller 26 (FIG. 4)) to transition operation from a normal (bypass) mode, in which the converters 124, 126 are inactive, to an alternate mode, in which the converters 124, 126 are active, to vary voltage across the DICD 10 and the ISLA 14 in the manner discussed above. Based upon the information ascertained by the bypass sensor(s) 132, voltage/current may thus bypass the converters 124, 126 and flow directly from the power source 24 to the circuitry in the ISLA 14 through the connector pins 56 and the connective surface(s) 58, or voltage/current may be directed through the converters 124, 126.

Once the conductive path is broken (e.g., once the water/moisture is sufficiently evaporated), an increase in resistance between the connector pins 56 (and/or the connective surface(s) 58) may be detected, such as, for example, by the bypass sensor(s) 132 or by circuitry in the power source 24. Upon such detection, operation of the DICD 10 may be returned to the normal mode in which voltage/current bypasses the converters 124, 126 such that normal efficiency in operation is restored.

With reference now to FIGS. 14 and 15, the corrosion of electrical contacts, such as the connector pins 56, may be accelerated when the contacts are at different direct current (DC) potentials such as, for example, when they act as the ground and positive voltage terminals of a power supply. The embodiment of the disclosure illustrated in FIGS. 14 and 15 addresses this issue by allowing for the commutation of voltage/current flowing from the power source 24 of the DICD 10. More specifically, the DICD 10 includes a commutation circuit 134, and the ISLA 14 includes a decommutation circuit 136. For example, the commutation circuit 134 may include a switching network with a first H-bridge FET switch driven by an oscillator on the DICD 10, and the decommutation circuit 136 may include a second H-bridge FET switch driven by the commutated voltage from the DICD 10 to restore the voltage to DC.

During use, the commutation circuit 134, which is in communication with the power source 24 of the DICD 10, transitions direct current (DC) from the power source 24 into alternating current (AC), and the decommutation circuit 136 receives and transitions the AC current into DC current prior to communication to the circuitry in the ISLA 14. By alternating between DC and AC current, the effective or average voltage potential between the connector pins 56 can be reduced to 0 V without impacting the overall efficiency of operation, thereby reducing corrosion in the presence of water/moisture.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments. For example, it is envisioned that the sealing member 118 (FIG. 10), the converter system 124 (FIG. 13), and/or the respective commutation and decommutation circuits 134, 136 (FIG. 14) may be combined with any other embodiment of the disclosure described herein.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "upward," "downward," "inward," "outward," etc., should be understood to describe a relative relationship between structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A digital image capturing device comprising:
   a device body including:
      connector pins surface-mounted thereto such that the connector pins extend externally of the device body; and
      a protective member extending about the connector pins; and
   an integrated sensor-lens assembly configured for non-rotatable, releasable connection to the device body via movement along a linear connection axis such that the device body and the integrated sensor-lens assembly are repeatably connectable and disconnectable, wherein the protective member is configured to form a seal with the connector pins upon connection of the integrated sensor-lens assembly to the device body, the integrated sensor-lens assembly including:
  at least one lens;
  a sensor configured to convert content captured by the at least one lens into an electronic signal; and
  at least one connective surface configured for contact with the connector pins to establish electrical communication between the device body and the integrated sensor-lens assembly upon connection.

2. The digital image capturing device of claim 1, wherein the protective member includes a resiliently compressible material.

3. The digital image capturing device of claim 1, wherein the connector pins extend through the protective member.

4. The digital image capturing device of claim 3, wherein the protective member includes openings positioned in alignment with the connector pins to allow the connector pins to extend through the protective member and contact the at least one connective surface.

5. The digital image capturing device of claim 4, wherein the openings are configured as slits.

6. The digital image capturing device of claim 1, wherein the protective member includes a hydrophobic material.

7. The digital image capturing device of claim 6, wherein the hydrophobic material is incorporated into the protective member.

8. The digital image capturing device of claim 6, wherein the hydrophobic material is applied to the protective member as a coating.

9. The digital image capturing device of claim 1, wherein the sensor includes: a charge-coupled device sensor; an active pixel sensor; a complementary metal-oxide-semiconductor sensor; or an N-type metal-oxide-semiconductor sensor.

10. The digital image capturing device of claim 1, wherein the device body and the integrated sensor-lens assembly include corresponding locking members configured for releasable engagement to maintain connection between the device body and the integrated sensor-lens assembly.

11. A digital image capturing device comprising:
  a device body including connector pins having first ends defining first connective surfaces and second ends opposite the first ends, wherein the first ends extend beyond an outer surface of the device body and the second ends are recessed into the device body, wherein the connector pins are arranged in a generally linear configuration such that adjacent connector pins are spaced axially from each other along a length of the device body; and
  an integrated sensor-lens assembly configured for releasable connection to the device body via movement along a linear connection axis, the integrated sensor-lens assembly including second connective surfaces aligned with the first connective surfaces such that, upon connection of the integrated sensor-lens assembly to the device body, electrical communication is established via contact between the first connective surfaces and the second connective surfaces.

12. The digital image capturing device of claim 11, wherein the device body includes:
  an external board; and
  an internal board spaced inwardly from the external board, the second ends of the connector pins located between the external board and the internal board.

13. The digital image capturing device of claim 11, wherein the device body and the integrated sensor-lens assembly include corresponding locking members configured for releasable engagement to maintain connection between the device body and the integrated sensor-lens assembly.

14. The digital image capturing device of claim 11, further including a protective member including slits positioned in alignment with the connector pins to allow the first connective surfaces to extend through the protective member and contact the second connective surfaces.

15. The digital image capturing device of claim 14, further including a hydrophobic material incorporated into the protective member or applied to the protective member.

16. A digital image capturing device comprising:
  a device body;
  connector pins having first ends defining first connective surfaces and second ends opposite the first ends, the connector pins supported by the device body such that the first ends are exposed from device body and the second ends are concealed within the device body;
  an integrated sensor-lens assembly configured for non-rotatable, releasable connection to the device body;
  at least one second connective surface on the integrated sensor-lens assembly configured for contact with the first connective surfaces on the connector pins to establish electrical communication between the device body and the integrated sensor-lens assembly upon connection;
  a sealing member extending about the connector pins and including a unitary construction, the sealing member including openings positioned in alignment with the connector pins to allow the first connective surfaces to extend through the sealing member and contact the at least one second connective surface; and
  corresponding locking members on the device body and the integrated sensor-lens assembly configured for mechanical engagement to maintain connection between the device body and the integrated sensor-lens assembly.

17. The digital image capturing device of claim 16, wherein the integrated sensor-lens assembly includes:
  at least one lens; and
  a sensor configured to convert content captured by the at least one lens into an electronic signal.

18. The digital image capturing device of claim 17, wherein the sensor includes: a charge-coupled device sensor; an active pixel sensor; a complementary metal-oxide-semiconductor sensor; or an N-type metal-oxide-semiconductor sensor.

19. The digital image capturing device of claim 16, further including a hydrophobic material incorporated into the sealing member or applied to the sealing member.

20. The digital image capturing device of claim 16, wherein the openings in the sealing member are linear in configuration.

* * * * *